(12) United States Patent
Kohlmeier-Beckmann et al.

(10) Patent No.: US 8,579,479 B2
(45) Date of Patent: Nov. 12, 2013

(54) WARNING LAMP FOR AN AIRCRAFT

(75) Inventors: Carsten Kohlmeier-Beckmann, Buxtehude (DE); Martin Griesbach, Unna (DE); Bernhard Müller, Arnsberg (DE); Sonja Ferling, Eching (DE); Andre Hessling, Koblenz (DE); Sascha Lüder, Rietberg (DE)

(73) Assignee: Goodrich Lighting Systems GmbH (DE)

( * ) Notice: Subject to any disclaimer, the term of this patent is extended or adjusted under 35 U.S.C. 154(b) by 185 days.

(21) Appl. No.: 12/996,831

(22) PCT Filed: Jun. 19, 2009

(86) PCT No.: PCT/EP2009/057675
§ 371 (c)(1),
(2), (4) Date: Mar. 15, 2011

(87) PCT Pub. No.: WO2009/156349
PCT Pub. Date: Dec. 30, 2009

(65) Prior Publication Data
US 2011/0261577 A1    Oct. 27, 2011

Related U.S. Application Data

(60) Provisional application No. 61/074,847, filed on Jun. 23, 2008.

(30) Foreign Application Priority Data

Jun. 23, 2008    (EP) .................................... 08158766

(51) Int. Cl.
*B64D 47/02*    (2006.01)
(52) U.S. Cl.
USPC ....... 362/470; 362/373; 362/362; 362/249.02
(58) Field of Classification Search
USPC ............... 362/311.01–311.05, 543–549, 555, 362/800, 249.01–249.03
See application file for complete search history.

(56) References Cited

U.S. PATENT DOCUMENTS

| | | | |
|---|---|---|---|
| 7,645,053 B2 * | 1/2010 | Machi et al. | ................... 362/241 |
| 2002/0008976 A1 | 1/2002 | Gronemeier et al. | |

(Continued)

FOREIGN PATENT DOCUMENTS

| | | |
|---|---|---|
| EP | 1 176 053 A2 | 1/2002 |
| FR | 2 173 739 | 10/1973 |

(Continued)

*Primary Examiner* — Donald Raleigh
(74) *Attorney, Agent, or Firm* — Cantor Colburn LLP

(57) ABSTRACT

The warning lamp for an aircraft is provided with a housing (10) which possesses a light permeable cover (12) that is exposed to the surrounding air when the housing is mounted on the aircraft, with a frontal cover area and a rear cover area, a mounting element (44) to fasten the cover to a lower part (14) of the housing (10), wherein one edge (41) of the cover (12) is covered by an edge of the mounting element (44) and protrudes from it, a lamp with at least one LED (42,46,58,60), which is arranged within an area that is covered by the cover (12), and a cooling body (18) for the at least one LED (42, 46,58,60), wherein the cooling body (18) possesses a cooling surface (32) that is exposed to the surrounding air when the housing (10) is mounted on the aircraft. The frontal cover area is formed by a frontal cover element (22) which is made from a light permeable first material. The rear cover area is formed by a rear cover element (28), which is made from a light permeable second material. The cooling body (18), while separating the frontal cover element (22) from the rear cover element (28), is arranged between them, wherein its cooling surface (32) is a part of the external contours of the cover (12) of the housing (10) that is given by the frontal and rear cover elements (22,28) and possesses an upper region (38) as well as adjacent, opposing side areas (40).

15 Claims, 2 Drawing Sheets

(56) References Cited

U.S. PATENT DOCUMENTS

Figure 1:
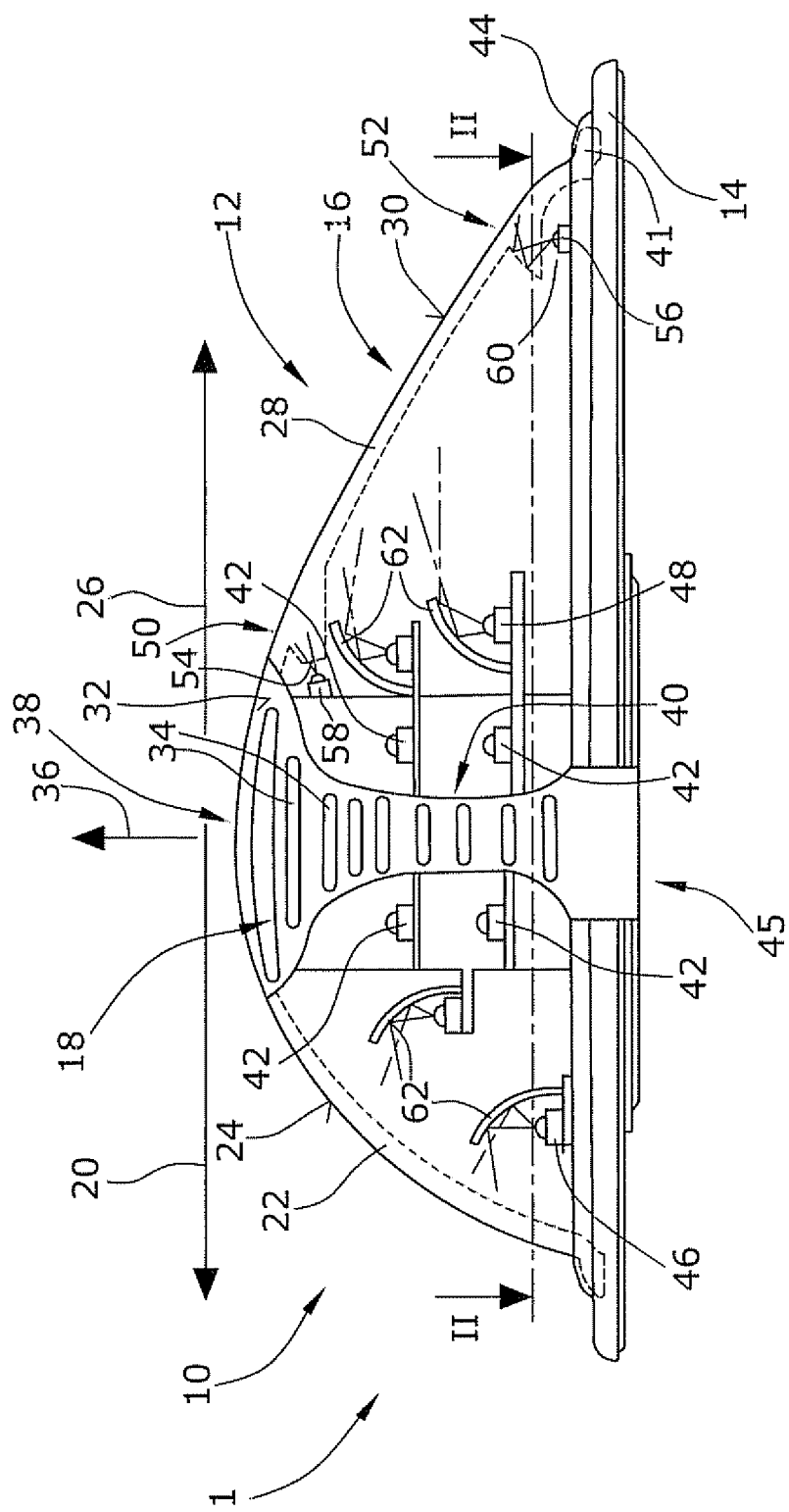

2002/0093820 A1* 7/2002 Pederson .................. 362/241
2002/0149944 A1* 10/2002 Worsdell et al. ............ 362/470

FOREIGN PATENT DOCUMENTS

| WO | 00/71417 A1 | 11/2000 |
| WO | 2006/091225 A1 | 8/2006 |

* cited by examiner

WARNING LAMP FOR AN AIRCRAFT

CROSS-REFERENCE TO RELATED APPLICATIONS

This application claims priority of international application no. PCT/EP2009/057675 filed Jun. 19, 2009, which claims priority of European patent application EP 08158766.9 filed Jun. 23, 2008 and U.S. provisional patent application 61/074,847 filed Jun. 23, 2008.

The invention involves a warning lamp for an aircraft and particularly a warning lamp for an airplane which emits a red strobe light.

On the outside of an airplane or another aircraft, there are numerous lights, such as warning lights and position or navigational lights, which emit their light within statutorily specified spatial angles. Among others, civil and military air traffic uses warning lamps which emit their light in the form of strobe lights in white or red colors.

Until a few years ago, the warning lights on the exterior of an aircraft were equipped with Xenon lamps as lighting. These known warning lamps included housing with a domed, light permeable cover which is exposed to the surrounding air when the warning lamp is mounted on the aircraft.

For aerodynamic reasons, the covers of the known warning lamps have a largely drop or egg-shaped form with a frontal cover area which points into the direction of flight and a rear cover area which points in the opposite direction.

The cover is fastened on a lower part of the housing—which is mounted on the aircraft—with a mounting element in the form of a ring which surrounds the edge of the cover and from which the cover protrudes.

In recent years, LEDs have found increasing use in exterior lighting on aircraft. These light emitting semiconductor diodes have a significantly longer service life and are not nearly as subject to breakdowns as Xenon lamps.

LEDs furthermore require electronic control units which are smaller and weigh less than the switching electronics of Xenon strobe lights. However, the heat sensitivity of LEDs is problematic. Furthermore, their emission properties are not necessarily suited to use in warning or positional lights of airplanes. Therefore, the currently available LED warning lights with a light output that is comparable to Xenon strobe lights are still very large and heavy in order to combine the desired emission properties of the warning lights with good heat removal.

WO-A-2006/091225 describes a warning lamp for aircraft which is equipped with a cooling body that has cooling blades which are exposed to an airflow that moves along the housing of the warning lamp when the aircraft is in flight. The cooling body of the known warning lamp serves to remove the loss output that is generated by the LEDs in the form of heat. For this purpose, the cooling body is located on the cover, which is not problematic, since the warning lamp must emit its strobe light largely throughout 360 degrees laterally and upwards at an angle, that is, directly over the warning light—that is, in a location where the cooling body/cooling blades of the known warning lamp are placed and where no light need be emitted.

Further warning lamps for aircraft are disclosed in WO-A-00/71417, EP-A-1 176 053, and FR-A-2 173 739.

A certain disadvantage of the known warning lamp is, however, seen in that it is formed as a rotationally symmetric body similar to a blunt cone with no optimal aerodynamic properties, thereby negatively influencing air resistance (parasitic drag).

The object of the invention is to create a warning lamp for an aircraft which uses LED lights and whose housing or cover has an aerodynamically beneficial form, wherein all requirements for spatial distribution of light in warning lamps for aircraft are fulfilled.

To solve this task, the invention suggests a warning lamp for aircraft which is provided with
- a housing which, when the housing is mounted on the aircraft, has a light permeable cover that is exposed to the surrounding air, with a frontal cover area and a rear cover area,
- a mounting element to fasten the cover on the aircraft and/or on a lower part of the housing, wherein an edge of the cover is covered by an edge of the assembly element and protrudes from it,
- a lighting agent with at least one LED (, which is arranged within an area that is delimited by the cover), and
- a cooling body for the (at least one) LED, wherein the cooling body possesses a cooling surface that is exposed to the surrounding air when the housing is mounted on the aircraft.

In this warning lamp, the invention provides that
- the frontal cover area is formed by a frontal cover element which is made from a light permeable first material,
- the rear cover area is formed by a rear cover element which is made from a light permeable second material, and
- the cooling body, with separation of the frontal cover element from the rear cover element, is arranged between the two, wherein its cooling surface is a part of the external contours of the housing cover which are provided by the frontal and rear cover elements and comprises both an upper area and connecting side areas that lie opposite each other.

The warning lamp in accordance with the invention has a housing which has a lower part for fastening to the aircraft and a light permeable cover. The light permeable cover is held against the lower part of the housing/against the aircraft with a ring shaped mounting element. Herein the mounting element surrounds the edge of the cover, which extends in a dome-like manner in an upwards direction. The cover may have an aerodynamic form which is, for instance, drop or egg-shaped or bionic, that is, derived from the streamlined shapes of living beings.

In the invention, the cover of the warning lamp is formed in two parts and includes a frontal cover element that points in the direction of flight and is made from a light permeable first material, and a rear cover element that points in the direction opposing the direction of flight and is made of a light permeable second material which is similar to or different from the first material. Between the two cover elements, there is an interim piece consisting—so to speak—of a cooling body or parts of a cooling body, wherein the surface of the cooling body together with the two cover elements form the aerodynamic shape or the external contours of the cover, that is, the area of the warning lamp which protrudes from the lower part of the housing. Herein the cooling body separates the two cover elements from each other and possesses an upper area that is perpendicular to the direction of flight as well as adjoining opposite side areas which are lateral to the direction of flight. Like the two cover elements, the cooling body's side parts are advantageously surrounded/enclosed by the mounting element.

In the warning lamp in accordance with the invention, the cooling body with its cooling surfaces that are exposed to the airflow are located in the upper area and in the side areas of the warning lamp. According to current regulations, the warning lamp does not have to emit light directly upwards.

Light emission on the side areas of the cooling surface of the cooling body is realized by LED lamps which—looking in the direction of flight—are arranged bilaterally, that is, in the direction of flight both before and behind the side areas within the two cover elements, and emit light to the side and upwards at an angle.

The benefit of the structure of the warning lamp in accordance with the invention with two cover elements as a light permeable cover is that one can now freely choose the transparent materials for the two cover elements. While the frontal cover element which points in the direction of flight should preferably be made from a suitable erosion resistant material such as glass, the transparent material for the rear cover element could be made from a less erosion resistant material such as plastic. The rear cover element that is made from plastic may possess light control areas in the form of areas that are shaped inwards and through which the light can particularly be intensified in the rearward pointing emission directions that are at a small angle from the direction of flight, or which can be used to increase its intensities. The materials of both cover elements may, however, also be the same.

The benefit of the concept in the invention is furthermore that the known warning lamps which are based on Xenon light technology can be changed without problems, since the warning lamp in accordance with the invention can have the same drop or egg formed shape as the known warning lamps. This greatly simplifies the process of replacing exterior lights of aircraft with new lighting technologies, wherein the weight of the warning lamp that is equipped with LED lights as per the invention can be noticeably reduced in comparison to the Xenon strobe lights. Furthermore, the warning lamp in accordance with the invention profits from the low likelihood of failures and the long service life of LED lamps.

As already mentioned above, warning lights for aircraft do not have to emit light directly above the cover of the warning light. Rather, the light must be emitted all around throughout 360 degrees as well as slightly angled upwards. This means that the upper area of the cooling surface of the cooling body between the frontal and rear cover areas can have a relatively large extent, while the two side areas of the cooling surface which extend to the mounting element can be more slender or narrow. This can be realized without problems when using the structural concept of the warning lamp as in the invention.

The thermal loss output of the LEDs is largely removed through the cooling surface of the cooling body that is exposed to the airflow. Furthermore, in an advantageous development of the invention, the cooling body, on the segments which form the side areas of the cooling surface, can be thermally linked to the assembly element. In this way, heat is also drained through the mounting element and if applicable, from there through the exterior skin of the aircraft.

By maintaining the drop or egg-shaped external contours of the warning lamp, it is simple to remove the two cover elements from their molds when they are being produced. Herein, as already mentioned above, light conductor functions can be integrated into the rear cover element, which advantageously consists of transparent plastic. This, in turn, makes it possible to comply with statutory requirements for intensity of emitted light in the rear part of the warning lamp in relation to the direction of flight, namely with the use of LED lamps.

The multi-part structure of the domed or cap-shaped cover in accordance with the invention means that the transitions between the cooling body on the one hand and the two cover elements on the other hand are produced in a weather resistant and particularly moisture resistant form.

For this purpose, a further development of the invention provides that the cooling body, on its frontal end which points in the direction of flight as well as its rear end which points in the direction opposite from the direction of flight, has an edge which interlinks with an edge of the rear cover element or is formed so that they overlap or engage with each other, wherein there is a sealant between the edges in each case.

For this mechanical connection of the cooling body on the one hand and the two cover elements on the other hand, there are—according to an advantageous further development of the invention—various solutions, such as sealing cords, which are let into opposing grooves of the overlapping edges or other sealing elements, tongue and groove formations, or so-called Aeroseal materials, as they are known and used in aircraft technology.

An overlapping edge structure in which the edge of the frontal cover element protrudes out relative to the adjacent cooling area of the cooling body and in which the edge of the cooling body that faces the rear cover element also protrudes outward, and in both cases, for practical reasons, within a range from 0.1 mm to 0.5 mm and preferably by 0.3 mm, has proven to be aerodynamically beneficial.

Figure 2:
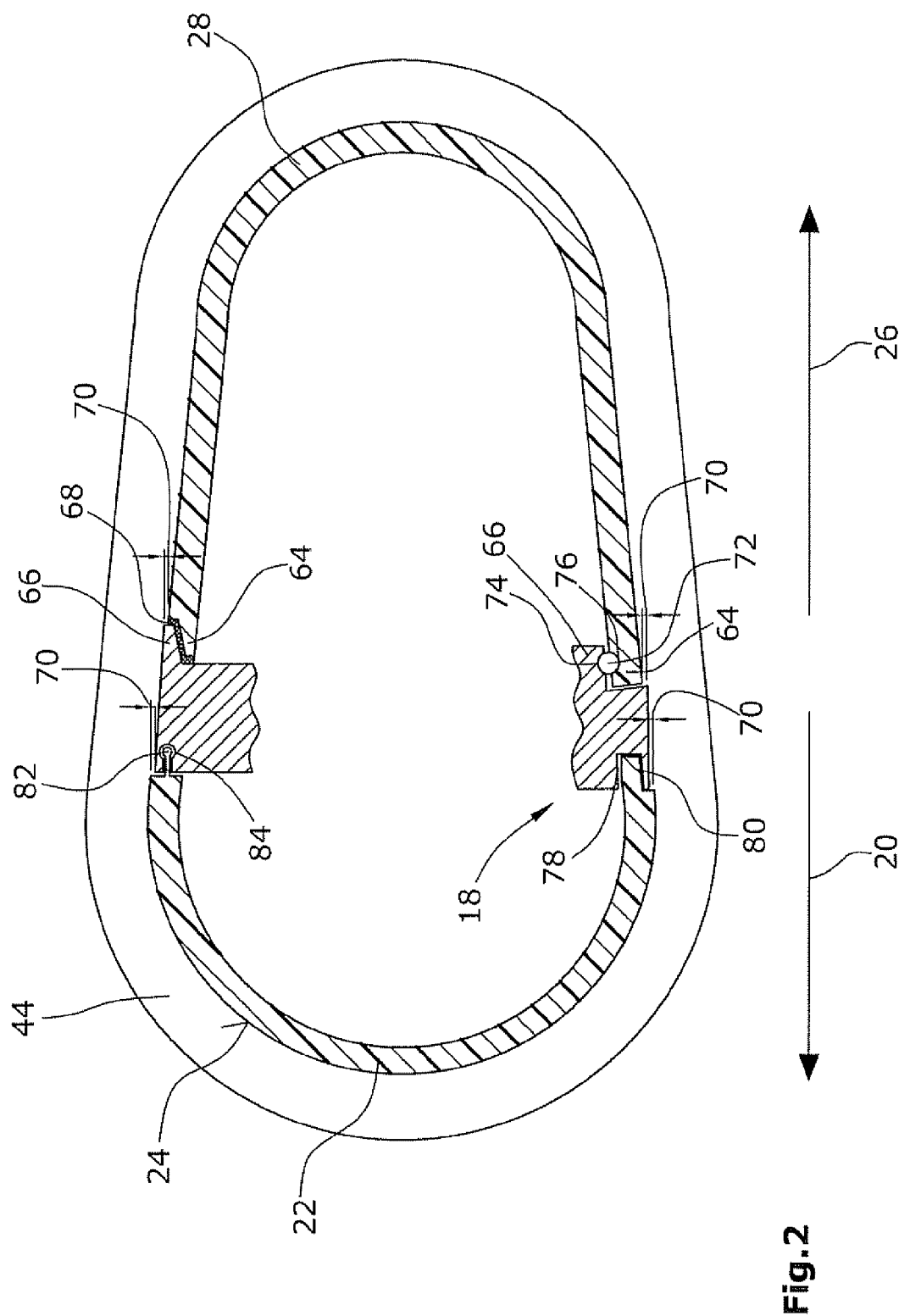

The invention is explained in further detail below using a sample embodiment of the invention. In detail, the following are shown:

FIG. 1 a side view of a warning lamp with largely drop or egg-shaped aerodynamically favorable external contours of their cover and cooling body surface configuration and FIG. 2 a cross-section along the line II-II of FIG. 1 through the cover and the cooling body, without showing the lower part of the housing of the warning lamp.

FIG. 1 shows a side view with a partial section of a strobe lamp warning lamp 1, which has a housing 10 with an upper part 12 and a plate-formed lower part 14, which, when the warning lamp 1 is mounted, is located on the exterior skin of an aircraft, such as an airplane.

The upper part 12 of the housing 10 which protrudes from the lower part 14 includes a two-part light permeable cover 16 as well as a cooling body 18. The cover 16 possesses a frontal light permeable cover element 22 which points in the direction of flight 20 and is made of, e.g., glass or with a glass-hard exterior surface 24 and is furthermore equipped with a rear cover element 28 that points opposite the direction of flight 20, that is, in the direction of the arrow 26, and is made from transparent plastic, with an outer surface 30.

The cooling body 18, whose exterior surface forms the cooling surface 32, possibly with tongues or grooves 34 that run parallel to the direction of flight 20 and which form the drop, dome or egg shaped external contours of the warning lamp 1 together with the exterior surfaces 24,30 of the cover 16, is located between these two cover elements 22,28. The cooling surface 32 of the cooling body 18 herein extends into the direction of flight 20 as seen throughout 180 degrees and has an upper area 38 that points up in the direction of the arrow 36 and adjacent opposing side areas 40 which are oriented laterally to the direction of flight 20. This three-part cover 16 with the cooling surface 32 is surrounded at its surrounding edge 41 that lies on the lower part 14 by a ring-shaped or flange-like mounting element 44 which is made of metal, and which is, for instance, bolted to the lower part 14 of the housing 10 of the warning lamp 1.

As shown in FIG. 1, the cooling body 18 is larger in its upper area 38 between the frontal and rear cover elements 22,28 than within its opposing side areas 40. For good thermal linkage to the air surrounding the warning lamp 10, the cooling body should have a comparably large cooling surface 32.

Since the warning lamp 1 does not have to emit light upwards, that is, in the direction of the arrow 36, the cooling body can have a relatively large area in the region 38 of its cooling surface 32.

On the other hand, light must be emitted in the region of the side areas 40 of the cooling surface 32 of the cooling body 18. Therefore, the cooling surface 32 is made narrower in the side areas 40, so that LEDs 42 can provide sufficient light emission from this location, meeting the statutory requirements in terms of intensity and distribution.

As shown in FIG. 1, the cooling body 18 can be thermally linked to the mounting element 44 in an advantageous manner. This is shown in FIG. 1 at 45.

Like the cooling body 18, the mounting element 44 also consists of a metal, particularly a metal alloy, which is preferably an aluminum alloy. The lower part 14 of the housing 10 of the warning lamp 1 is also preferably made from a metallic material.

Aside from the LEDs 42 which ensure side emission of the light from the warning lamp 1, the warning lamp 1 has other LEDs 46 to emit light in the direction of flight 20 as well as in the required height and side angles in relation to it. In the same manner, other LEDs 48 ensure light emission in the direction that opposes the direction of flight (that is, in the direction of the arrow 26) as well as the required height and side angles from it. Herein it must be noted that FIG. 1 does not by far show all LEDs which are required for the required light distribution and light intensity distribution of the warning lamp 1.

Due to the angled progression of the rear cover element 28, even uncoupling the light from the LEDs within small height and side angles in the direction opposing the direction of flight 20 (arrow 26) causes certain difficulties.

Herein, it is advantageous that due to selecting "plastic" as the material for the rear cover element 28, it is possible to integrate light technology functions into the cover element 28, as shown in FIG. 1 at 50 and 52.

In these areas, the rear cover element 28 possesses internal light inclusion surfaces 54,56 opposite which LEDs 58, 60 are arranged, which, in turn, are arranged on the cooling body 18 or the lower part 14. As indicated in 50 and 52, the rear cover element 28 therefore has a partial light conductor function, which specifically makes it possible to adapt and influence the light distribution and light intensity in accordance with statutory requirements and while using as few LEDs as possible.

Regarding FIG. 1, it must also be noted that herein 62 refers to reflectors which can be assigned to individual LEDs or groups of LEDs. Aside from reflective optical elements (such as the reflectors 62), the warning lamp 1 may alternatively or additionally use refractive optical elements such as lenses for light distribution.

FIG. 2 shows a horizontal section along line II-II of FIG. 1 through the cover 16, wherein the mounting ring 44 is also shown. The cooling body 18 is likewise only partially shown/sectionally shown.

FIG. 2 shows several variants of a possible mechanical linkage of the cooling body 18 with the frontal and rear cover elements 22,28. FIG. 2, top right, shows a possible connection of the rear cover element 28 with the cooling body 18, wherein both show overlapping edges 64, 66 with a sealing material 68 arranged between them. The outer surface 24 of the rear cover element 28 herein moves back by the distance 70 as compared to the cooling surface 32 in the side areas 40 of the cooling body 18.

As shown in FIG. 2 bottom right, the connection of the cooling body 18 to the frontal and/or rear cover element 22,28 may, however, also be made by using a sealing cord 72 with an O cross-section, which is placed into overlapping grooves 74,76 of the overlapping edges 64,66 of the cooling body 18 and the cover element 22 or 28.

Referring to FIG. 2 to the left of the cooling body 18, two other possible variants of the mechanical connection of the cooling body 18 and the cover element 22 or 28 are shown. At bottom left, a tongue and groove-like arrangement 78,80 is shown, while FIG. 2 at top left shows a configuration comprising cooperating undercut and thickened parts. In the last named case, is the (frontal in this case) cover element 22 has a bulging thickened part 82 which is either attached or formed in a single piece and which is placed into a receiving groove 84 with an undercut.

Herein it must be noted that the mechanical connections of the cooling body 18 as shown in FIG. 2 can be constructed with the two cover elements 22,28 regardless of whether the cover elements 22,28 are made from glass material, that is, an erosion resistant material, or plastic, that is, a less erosion resistant material. It is also possible to construct the joint of the cover elements 22,28 with the cooling body 18 by means of two opposing angled and largely parallel surfaces on the parts to be joined, which allows very good tolerance equalization.

It should furthermore be noted that in all embodiments of the mechanical connection designs, the rear part as seen in the direction of flight 20 (that is, the cooling body opposite the frontal cover element 20 and the rear cover element 24 opposite the cooling body 18) are arranged so that they are shifted inwards. This rearward shift is shown in FIG. 2 at 70 in each case. In general, one can say about the mechanical connection between the cover elements and the cooling body that it should be designed in accordance with the commonly differing expansion coefficients, hollowing of joints due to erosion and long-term tightness as well as the required shock resistance against foreign objects. In principle, permanently elastic form fitted connections are particularly suitable for this, as is the case with the variants of the O ring, tongue and groove, and bulge/receiving groove.

It is particularly practical if hardening of hardenable permanently elastic sealing elements takes place in their end position, that is, after assembly and mounting, so that local material tension can be avoided and manufacturing tolerances can be absorbed. As already mentioned, it is also advantageous to set back the adjacent area which is seen as opposite the direction of flight by preferably 0.3 mm+/−0.25 mm, since this size range has been shown to constitute an especially beneficial weighting as a gap and edge protection against erosion, air resistance and surrounding volumes.

The invention claimed is:

1. A warning light for an aircraft comprising:
a housing comprising a base and a cover, the base comprising a flange member adapted for mounting to an external surface of the aircraft, the cover defining a contoured exterior surface of the housing which is exposed to the surrounding air when the housing is mounted to the external surface of the aircraft, the cover further comprising a front cover portion formed of a light permeable material and a separate rear cover portion also formed of a light permeable material, the front cover portion being disposed forward of the rear cover portion when the housing is attached to the external surface of the aircraft;
a lamp comprising at least one LED disposed within the cover; and
a cooling body disposed between the front cover portion and the rear cover portion, the cooling body having a cooling surface forming at least part of the contoured exterior surface of the housing, wherein the cooling body completely separates the front cover portion from the rear cover portion.

2. The warning light of claim 1, wherein:
the front cover portion and the rear cover portion are formed of a material chosen from the group consisting of glass and plastic; and
the cooling body is formed of a metal material.

3. The warning light of claim 1, wherein:
the front cover portion, the rear cover portion and the cooling body cooperate to form a substantially smooth teardrop shaped cover.

4. A warning light for an aircraft comprising:
a housing comprising a base and a cover, the base comprising a flange member adapted for mounting to an external surface of the aircraft, the cover defining a contoured exterior surface of the housing which is exposed to the surrounding air when the housing is mounted to the external surface of the aircraft, the cover further comprising a front cover portion formed of a light permeable material and a separate rear cover portion also formed of a light permeable material, the front cover portion being disposed forward of the rear cover portion when the housing is attached to the external surface of the aircraft;
a lamp comprising at least one LED disposed within the cover;
a cooling body disposed between the front cover portion and the rear cover portion, the cooling body having a cooling surface forming at least part of the contoured exterior surface of the housing; and
a mounting ring formed of a metal material, the mounting ring adapted to engage a lip formed on the front cover portion and a lip formed on the back cover to retain the front cover portion and the back cover portion to hold the front cover portion and back cover portion to the base.

5. The warning light of claim 4, wherein:
the mounting ring is thermally coupled to the cooling body.

6. The warning light of claim 1, wherein:
the cooling body is substantially U-shaped in a cross section normal to the cooling surface.

7. The warning light of claim 6, wherein:
the cooling body is contoured along the cooling surface so that the cooling surface is wider in a region distal from the flange member and narrower in the regions proximal the flange member.

8. The warning light of claim 1, wherein:
the front cover portion, the cooling body and the rear cover portion are stepped so that at a joint between the front cover portion and the cooling body, the front cover portion extends outward beyond the cooling body and at a joint between the cooling body and the rear cover portion, the cooling body extends outward beyond the rear cover portion.

9. The warning light of claim 8, further comprising
a sealing agent disposed in the joint between the front cover portion and the cooling body and in the joint between the cooling body and the rear cover portion.

10. The warning light of claim 1, wherein:
the rear cover portion includes at least one light guide formed on an interior surface thereof.

11. The warning light of claim 4, wherein:
the cooling body is substantially U-shaped in a cross section normal to the cooling surface.

12. The warning light of claim 11, wherein:
the cooling body is contoured along the cooling surface so that the cooling surface is wider in a region distal from the flange member and narrower in the regions proximal the flange member.

13. The warning light of claim 4, wherein:
the front cover portion, the cooling body and the rear cover portion are stepped so that at a joint between the front cover portion and the cooling body, the front cover portion extends outward beyond the cooling body and at a joint between the cooling body and the rear cover portion, the cooling body extends outward beyond the rear cover portion.

14. The warning light of claim 13, further comprising
a sealing agent disposed in the joint between the front cover portion and the cooling body and in the joint between the cooling body and the rear cover portion.

15. The warning light of claim 4, wherein:
the rear cover portion includes at least one light guide formed on an interior surface thereof.

* * * * *